United States Patent Office 3,415,974
Patented Dec. 10, 1968

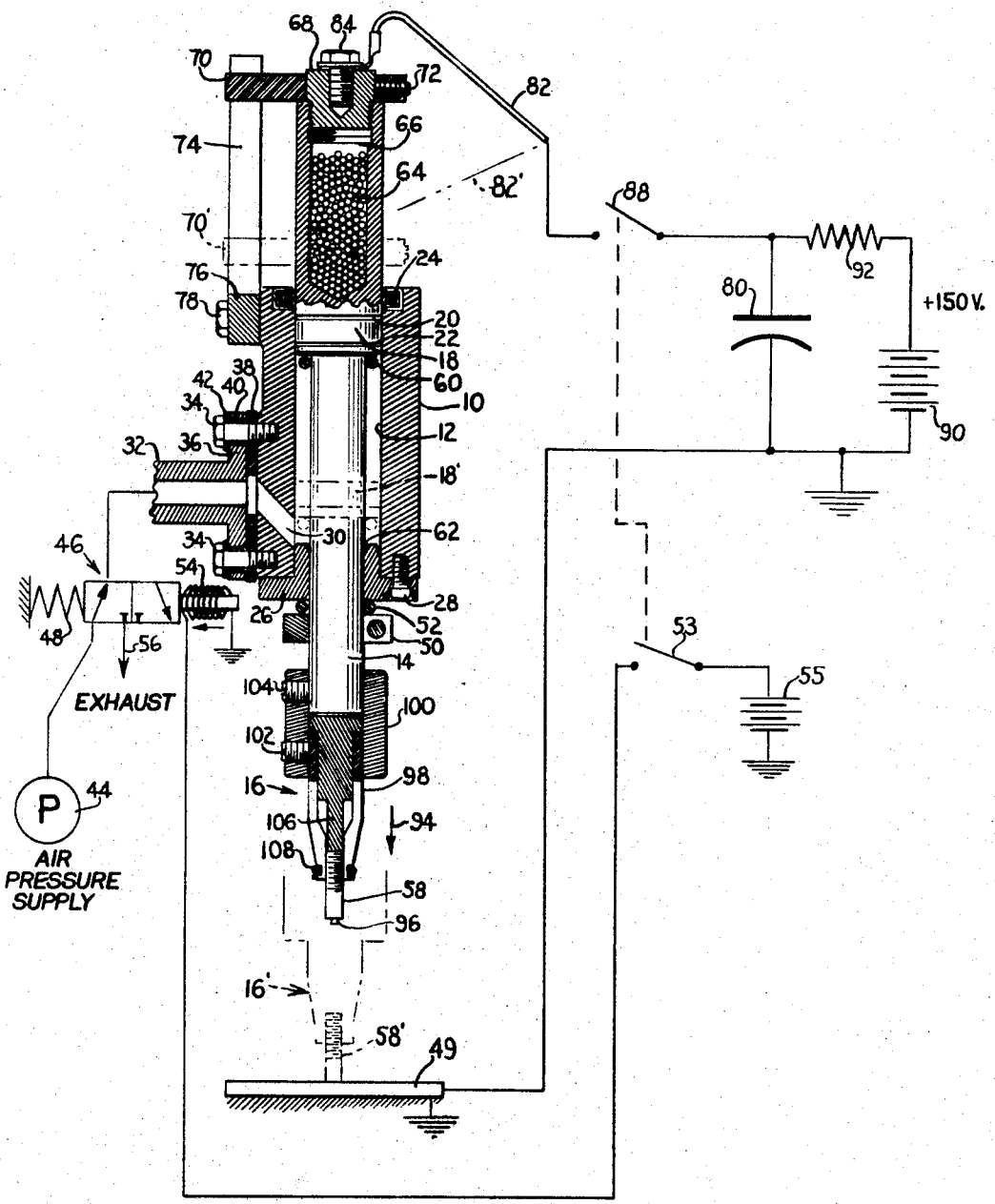

3,415,974
GRAVITY DROP STUD WELDER
Harold J. Graham, Sharon, Mass., assignor to Omark Industries, Inc., Portland, Oreg., a corporation of Oregon
Filed Aug. 21, 1964, Ser. No. 391,157
10 Claims. (Cl. 219—95)

ABSTRACT OF THE DISCLOSURE

A stud welding apparatus and method are described in which a stud having a tip portion of reduced cross section is moved downward into contact with another workpiece entirely by the force of gravity and welded thereto by an electrical arc produced in part by vaporizing the tip portion. Shock absorber means, such as loose shot carried by the stud holder, is employed to prevent rebound of the stud away from the workpiece and to provide an adjustable weight which enables the impact force to be varied.

---

The subject matter of the present invention relates generally to stud welding method and apparatus, and in particular to stud welders of the percussion type in which the stud holder and its support shaft are dropped and moved freely downward entirely by the force of gravity to cause the stud to strike a workpiece with a predetermined force. Electrical current is caused to flow through such stud and such workpiece to produce an electrical arc between these members which heats only the tip end of the stud and a portion of the workpiece lying beneath such end to a sufficiently high temperature to cause melting at the surfaces of such end and such portion in order to weld the stud to the workpiece when such stud strikes such workpiece. The force with which the stud strikes the workpiece can be varied by adjusting the amount of weight which may be in the form of loose shot, supported on the stud holder shaft or by varying the distance the stud is dropped onto the workpiece. In addition, it has been found that if the shot or other weight is free to move upward with respect to the stud holder shaft, such weight will absorb the shock of the impact when the stud strikes the workpiece and will prevent the rebound of such stud away from the workpiece which might otherwise produce defective welds.

The stud welder of the present invention is especially useful for welding studs to the surfaces of larger workpieces such as thin sheets of metal for the attachment of another member by screw threads or other means on such studs. Each of the welding studs is provided with a tip portion projecting centrally from one end thereof of a smaller sectional area than the shank of the stud so that such tip portion is rapidly heated and vaporized during welding by the passage of electrical current therethrough to produce an electrical arc between the stud and the workpiece. As a result, the tip end of the stud and a portion of the workpiece are heated predominantly by such arc rather than by resistance heating used in early percussion welders which would waste the electrical current used to form the weld because then much of such current would heat portions of the stud and workpiece remote from the surfaces to be welded. In addition, arc heating is superior to resistive heating because the latter would cause the amount of heat transmitted to the welded surfaces to vary with materials of different electrical resistance and workpieces of different size which is prevented by arc heating.

Previous stud welders have employed springs, fluid pressure, and electromagnetic solenoids to produce the force which moves the stud into contact with the workpiece. However, all of these techniques are subject to the defect that the amount of such force can vary from weld to weld so that all of such welds will not be of the substantially same strength, and some may even be defective. The stud welder of the present invention has an advantage over such conventional stud welders in that it employs only the force of gravity, which of course is always constant, to move the studs into contact with the workpiece at substantially the same speed for a given height setting with the result that the strength of the welds does not vary appreciably from weld to weld. Another advantage of the present apparatus is accomplished by the use of weights which are free to move upward with respect to the stud holder shaft on which they are supported to absorb the shock caused by the impact of the stud on the workpiece and to prevent rebound of such stud away from the workpiece and the production of faulty welds. In addition, the stud holder shaft is prevented from rotational movement by a guide means as the shaft and stud holder fall so that the stud is not being twisted during the time the welds are being formed which produces stronger welds.

Briefly one embodiment of the stud welder of the present invention includes a stud holder mounted at one end of a plunger shaft which extends through a cylinder so that the other end of such shaft forms the piston of such cylinder. The other end of the stud holder shaft is provided with a cavity for holding a plurality of lead shot loosely within such cavity to increase the force with which the stud strikes the workpiece and to absorb the impact of the stud on the workpiece and prevent rebound in the manner previously mentioned. The interior of the cylinder is connected through a passageway to either a source of pressurized air or an exhaust outlet by means of a two position valve which may be solenoid actuated. An adjustable stop is provided on the shaft of the stud holder to limit the upward movement of such shaft and correctly space the stud the proper distance from the workpiece. When the valve supplies pressurized air to the cylinder, the stud holder shaft rises until the stop on such shaft contacts the bottom of the cylinder and holds such shaft in a raised position. An electrical energy storage means which may be a plurality of charged capacitors is connected by a switch to the stud holder when a weld is to be made, and the valve is moved to the exhaust position so that the shaft and stud holder fall by the force of gravity until the welding stud within such holder strikes the workpiece and causes the capacitors to discharge, produce an arc and melt the tip end of the stud and a portion of the workpiece so that the stud is welded to such workpiece. After the weld is complete, the capacitors are disconnected from the stud holder and the valve moved to connect the air source to the cylinder to raise the stud holder and remove the welded stud from such holder.

It is therefore one object of the present invention to provide an improved welding apparatus which produces stronger welds of substantially uniform strength between workpieces of different size and of different materials.

Another object of the invention is to provide an improved stud welding apparatus in which the stud holder is allowed to drop by the force of gravity to cause the stud within such holder to strike the workpiece at a speed which is substantially constant from weld to weld when such stud holder is dropped from the same distance above the workpiece.

An additional object of the present invention is to provide an improved stud welder in which particles of shot or other adjustable weight is employed to cause a stud holder to fall and strike a stud within such holder against a workpiece with a predetermined force, and to absorb the shock of the impact of such stud on such workpiece by enabling upward movement of such weight while preventing upward rebounding movement of such stud to produce a stronger weld.

A further object of the invention is to provide an improved percussion type stud welder in which rotational movement of the stud holder is prevented as such stud holder is moved by the force of gravity toward the workpiece during welding in order to prevent the weld from being defective.

Still another object of the present invention is to provide an improved stud welding apparatus which is simple and inexpensive in construction and which can be operated automatically to produce welds of great strength and uniformity.

A still further object of the present invention is to provide an improved method of stud welding employing the force of gravity to move the stud into contact with the workpiece at a predetermined speed and electrical arc heating in order to produce strong welds of more uniform strength.

Other objects and advantages of the present invention will become apparent from the following detailed description of a preferred embodiment thereof and from the attached drawings of which:

The figure shows a partial sectional view of one embodiment of a stud welding apparatus in accordance with the present invention shown in raised and lowered positions, along with a schematic representation of the electrical circuit and fluid pressure system employed with such apparatus.

As shown in the drawing, one embodiment of the stud welding apparatus of the present invention includes a cylinder 10 having a chamber 12 extending axially through the cylinder. A plunger shaft 14 having one end attached to a stud holder 16, extends through the chamber in cylinder 10 and has an enlarged head portion 18 of greater diameter at the other end of such shaft which is slightly less than the diameter of chamber 12 and functions as a piston within such cylinder. The head portion 18 of the plunger shaft is provided with a pair of annular grooves 20 and 22 around the outer surface thereof which are filled with oil to provide a gas-tight seal between the head portion and the cylinder wall. The outer surface of the head portion 18 of the plunger shaft is lubricated by a disc 24 of oil filled felt or other fiber mounted in an annular notch at the upper end of cylinder 10 around the bore 12 in contact with such head portion. This reduces the friction between the outer surface of the head portion or piston and the inner surface of the cylinder.

The lower end of the cylinder 10 is closed by a tubular plug 26 attached to such cylinder by means of bolts 28. The plug 26 is provided with an opening of substanatially the same diameter as the plunger shaft 14 to guide the axial movement of such shaft and is provided with an inner surface of low coefficient of friction which provides a gas-tight seal between the plunger shaft and the plug. The cylinder 10 is provided with a passageway 30 intersecting the cylinder bore 12 adjacent the top of the plug 26 and connected to a tubular support 32 which is attached to the cylinder by means of bolts 34 extending through a flange portion 36 of such tubular support. A sealing disc 38 of electrical insulating material is positioned between theh cylinder 10 and the flange 36 in order to provide a gas-tight seal between these members and to electrically insulate the tubular support 32 from the cylinder. In addition, each of the bolts 34 is provided with a sleeve 40 of insulating material around the shaft of such bolt and a washer 42 of insulating material beneath the head of such bolt in order to insulate the bolts from the tubular support 32.

The tubular support 32 is connected to a source 44 of compressed air or other fluid such as a pump through a valve 46 which may be a two position valve that is solenoid actuated. The valve is normally biased in the position shown by a spring 48 to cause air to flow from pump 44 through the valve, the tubular support 32 and passageway 30 into the cylinder chamber 12 to raise the plunger shaft and stud holder to the position shown in solid lines. This spaces the stud holder 16 a predetermined distance above a workpiece 49 which is set by the position of an adjustable stop clamp 50 attached to the plunger shaft 14 so that such stop limits the upward movement of such shaft by engagement with the plug 26 at the bottom of the cylinder. A rubber O-ring 52 may be provided around the plunger shaft 14 adjacent the upper surface of the stop clamp 50 to serve as a cushion between such stop clamp and the cylinder plug.

When it is desired to make a weld, a switch 53 is closed to energize the solenoid 54 of valve 46 by current from a D.C. voltage source 55 to move the valve to the other position in order to rapidly disconnect the pump 44 from the tubular support 32 and to connect such tubular support to an exhaust outlet 56. The exhaust outlet is of sufficiently large diameter to enable the air within the cylinder chamber 12 to be immediately exhausted out of such chamber by the downward movement of the head portion or piston 18 without producing an air cushion within such chamber which would impede the downward movement of such piston. The downward movement of the plunger shaft 14 is accomplished entirely by means of the force of gravity once the air pressure within the cylinder is released. The downward movement continues until a welding stud 58 supported within the stud holder 16 strikes the workpiece 49 and halts the stud holder and the piston in their lowered positions 16' and 18', respectively, shown in dashed lines. However, if the workpiece is removed or is positioned too far below the cylinder, it would be possible for the bottom of the piston 18 to strike the top of the plug 26 before the welding stud strikes the workpiece. In order to prevent this from damaging the plug or the piston, a rubber O-ring 60 is provided about the plunger shaft 14 adjacent the bottom of the piston to cushion the impact of such piston on such plug. In this position of the piston, it is difficult to transmit air between the bottom of the piston and the plug 26 through passageway 30 to raise such piston so that such passageway is inclined downward to direct air beneath the cushion ring 60 and into the small annular recess 62 provided in the top of the cylinder plug adjacent such cushion ring.

In order to vary the force with which the welding stud 58 strikes the workpiece 49, an adjustable weight is attached to the upper end of the plunger shaft. In order to prevent rebound of the stud away from the workpiece, a shock absorber means is employed which may be in the form of particles of lead shot 64 provided within a cavity 66 extending axially through the upper end of the enlarged head of the plunger shaft. The shot weight also functions as the adjustable weight and is loosely packed within the cavity 66, and a threaded cap member 68 is screwed into such cavity at the top of the shaft to close the cavity and prevent the shot from escaping. However, the cap member is spaced above the upper level of the shot sufficiently to enable upward movement of such shot when the stud strikes the workpiece. This upward movement of the shot weight absorbs much of the shock of the reactive force transmitted to the plunger shaft by the impact of the stud on the workpiece and prevents such stud and plunger shaft from rebounding upward and producing a defective weld. The cap member 68 is connected to a guide element 70 of low friction material by means of a set screw 72, and such guide element is positioned within an elongated vertical slot 74 in a guide member 76 attached through the cylinder by bolts 78 to prevent rotation of the plunger shaft during downward movement of such shaft. Thus, the guide element 70 prevents the welding stud 58 from rotating when such stud is being welded to the workpiece and thereby prevents a defective weld from being produced as a result of such rotation.

The plunger shaft 14 is connected through the cap member 68 to a source of stored electrical energy which may be a capacitance 80 through an electrical lead 82 which is fastened by means of a bolt 84 to such cap member. The capacitor 80 has one terminal connected to the same potential as the workpiece 49 which may be ground and has its other terminal connected through a normally opened switch 88 to the plunger shaft. The other terminal of the storage capacitor is also connected to a D.C. voltage source 90 of about 150 volts through a charging resistor 92 to charge such capacitor to the voltage of such source. When the plunger shaft and stud holder are dropped downward in the direction of arrow 94 by actuating the solenoid valve 46, the switch 88 is closed automatically by ganging such switch to switch 53 or any other suitable manner in order to apply the voltage on the storage capacitor 80 to the plunger shaft and stud holder. Since the welding stud 58 and the workpiece 59 are at different voltage potentials, current flows between such stud and such workpiece when the stud is moved into contact with or closely adjacent to the workpiece.

The welding stud 58 is provided with a tip portion 96 projecting centrally from the lower end of the stud which is to be welded to the workpiece. This tip portion is of smaller cross sectional area than the shank of the stud and may be of a cylindrical shape. The current flowing in the tip portion 96 quickly heats and vaporizes such tip portion and produces an electrical arc between the stud and the workpiece. In most cases the electrical arc is not produced until after the tip portion contacts the workpiece and such tip portion vaporizes. This electrical arc melts a portion of the surface of the workpiece 49 beneath the tip so that when the stud and workpiece are driven together by the force of gravity, these melted portions contact each other and fuse together to form the weld. This process takes place very rapidly and produces no appreciable resistive heating of other portions of the stud and the workpieces remote from the weld which would rob heat away from the weld.

Substantially all of the heating of the stud and workpiece is accomplished in a very short time by the electrical arc which together with the gravity drop stop enables studs of much larger diameter, on the order of ¼ inch and greater for aluminum, to be welded by the present method than can be welded by other types of percussion welding. The early percussion welding apparatus shown by Chubb in U.S. Patent 1,066,468 did not provide sufficient heating to weld large workpieces and was only able to weld small diameter wires together, which explains why the gravity drop principle of that patent has never been before applied to stud welders.

Any suitable type of stud holder can be employed in the apparatus of the present invention. Thus, a stud collet or chuck 98 having a plurality of resilient finger portions spaced apart by slots in one end of such chuck for frictional engagement with the welding stud 58, can be employed in such stud holder along with an adaptor sleeve 100 connected to the other end of the chuck by a set screw 102 and to the plunger shaft 14 by another set screw 104. An annular stop member 106 may be provided within the chuck 98 to engage the rear end of the welding stud for properly positioning such stud within the chuck jaws so that the tip end of the stud extends a predetermined distance out of the chuck. If welding studs having outer flanges at the tip ends of such studs are employed, such flanges can engage an external stop sleeve provided adjacent the end of the chuck of the type shown by Pomeroy et al. in U.S. Patent 3,119,008 in place of stop member 106. In order to increase the efficiency of the gripping fingers of the chuck 98, one or more rubber O-rings 108 may be provided in notches provided in the outer surfaces of such fingers surrounding the stud. Since the welding stud 58 is held merely by frictional engagement of the gripping fingers of chuck 98, such stud is removed from such chuck after the stud is welded to the workpiece 49 merely by raising the plunger shaft 14 to move the chuck away from the workpiece because such workpiece is h :n a fixed position by a suitable clamping means, not shown.

It will be obvious to those having ordinary skill in the art that many changes may be made in the details of the above-described preferred embodiment of the present invention without departing from the spirit of the invention. Therefore, the scope of the present invention should only be determined by the following claims.

I claim:
1. Stud welding apparatus comprising:
   stud holder means mounted for movement between an upper position and a lower position, for holding a welding stud;
   actuator means for controlling the movement of said stud holder, including means for supporting said stud holder in said upper position over a workpiece, means for causing said stud holder to freely fall entirely by gravity from said upper position to said lower position in order to strike a portion of the surface of said workpiece with the one end of said stud, and means for automatically returning said stud holder to said upper position; and
   means for preventing rebound of the stud away from the workpiece when said stud strikes said workpiece.
2. Stud welding apparatus comprising:
   a plunger member mounted for movement between an upper position and a lower position;
   stud holder means attached to said plunger for movement therewith for holding a welding stud with one end of said stud extending out of said holder means and the other end of the stud held within the stud holder means;
   actuator means for controlling the movement of said stud holder means, including means for supporting said plunger member and said stud holder in said upper position over a workpiece, and means for causing said plunger member and said stud holder to fall entirely by gravity from said upper position to said lower position in order to strike a portion of the surface of said workpiece with the one end of said stud;
   shock absorbing means for reducing rebound of the stud away from the workpiece when said stud strikes said workpiece; and
   means for producing an electrical arc between said one end of said stud and said workpiece to melt the surfaces of said one end of said stud and a portion of the surface of said workpiece in order to cause said stud to be welded to said workpiece when they are struck together.
3. Stud welding apparatus comprising:
   a plunger member mounted for movement between an upper position and a lower position;
   stud holder means attached to said plunger for movement therewith including stop means for engaging a welding stud having a tip portion of smaller cross sectional area than the shank of said stud and of a predetermined length projecting centrally from one end of the stud, to hold said stud within said holder means with said one end of said stud extending out of said holder means;
   actuator means controlling the movement of said stud holder, including means for supporting said plunger member and said stud holder in said upper position over a workpiece of larger area than said one end of said stud, means for causing said plunger member and said stud holder to fall entirely by gravity from said upper position to said lower position in order to strike a portion of the surface of said workpiece with the end of said stud, and means for automatically returning said stud holder to said upper position;
   means for producing an electrical arc between said tip portion of said stud and said workpiece when said stud is in said lower position to vaporize said tip portion and to melt the surfaces of said one end of said stud and a portion of the surface of said workpiece in order to cause said stud to be welded to said workpiece when they are struck together; and means for preventing rebound of said stud away from the workpiece during the formation of the weld.

4. Stud welding apparatus comprising:

a plunger shaft mounted for reciprocating movement;

a stud holder attached to said plunger shaft for movement therewith;

adjustable weight means carried by said plunger shaft for controlling the force with which the stud in said stud holder strikes a workpiece, said weight means being free to move relative to said shaft for reducing rebound of said stud from said workpiece;

fluid cylinder means including said plunger shaft as a piston for holding the stud holder in a raised position by fluid pressure to space the stud in said holder a predetermined distance from the workpiece; and actuator means for controlling the movement of said stud holder and plunger shaft, including means for reducing the fluid pressure in said cylinder means to remove the support from the plunger shaft and to cause said stud holder to fall entirely by gravity to a lowered position where the stud in said holder contacts the workpiece and is welded thereto, and means for increasing the fluid pressure in said cylinder means to raise said plunger shaft and to return said holder to said raised position.

5. Stud welding apparatus comprising:

a plunger shaft mounted for reciprocating movement;

a stud holder attached to one end of said plunger shaft for movement therewith;

weight means including particles of shot loosely contained within a cavity in the other end of said plunger shaft for controlling the force with which the stud in said stud holder strikes a workpiece and for absorbing the shock of the impact of said stud on said workpiece to prevent the rebound of said stud;

support means for holding the plunger shaft and the stud holder in a raised position to space the stud in said holder a predetermined distance from the workpiece; and means for removing said support means from the plunger shaft and causing said stud holder to fall entirely by gravity to a lowered position where the stud in said holder contacts the workpiece and is welded thereto.

6. Stud welding apparatus comprising:

a plunger shaft mounted for reciprocating movement;

a stud holder attached to said plunger shaft for movement therewith;

weight means carried by said plunger shaft for controlling the force with which the stud in said stud holder strikes a workpiece, said weight means being free to move with respect to said shaft for preventing the rebound of said stud from said workpiece;

support means for holding the plunger shaft and the stud holder in a raised position to space the stud in said holder a predetermined distance from the workpiece;

actuator means for removing said support means from the plunger shaft and causing said stud holder to fall entirely by gravity at a predetermined speed to a lowered position where the stud in said holder contacts the workpiece and is welded thereto, and for moving said piston back to said first position to return said holder to said raised position; and guide means for preventing rotation of said stud holder during downward movement of said stud holder.

7. Stud welding apparatus comprising:

a plunger shaft mounted for reciprocating movement;

a stud holder attached to said plunger shaft for movement therewith;

shock absorber means including variable weight loosely secured to said plunger shaft for controlling the force with which a stud in said stud holder strikes a workpiece and for preventing rebound of said stud from said workpiece;

fluid cylinder means for holding the plunger shaft and stud holdwer in a raised position by fluid pressure to space the stud in said holder a predetermined distance above the workpiece;

variable stop means for varying said distance;

valve means for reducing the fluid pressure in said cylinder means to remove the support from the plunger shaft and to cause said stud holder to fall entirely by gravity to a lowered position where the stud in said holder contacts the workpiece and is welded thereto, and for increasing the fluid pressure in said cylinder means to raise said plunger shaft and to return said holder to said raised position; and electrical energy storage means connected to said stud holder for producing an electrical arc between the stud and the workpiece to melt one end of said stud and a portion of said workpiece while said stud is being moved toward said lowered position.

8. A method of stud welding comprising the steps of:

holding a welding stud a predetermined height above a workpiece, said stud having a shank portion and a tip portion extending centrally from one end of said shank portion and being of a substantially smaller cross section than said shank portion;

causing said stud to fall freely downward entirely by the force of gravity so that one end of said stud strikes said workpiece with a predetermined force at a velocity which is substantially constant for successive welds; and applying an electrical potential between said stud and said workpiece to completely vaporize said tip portion and produce an arc which causes electrical current to flow between said one end of said stud and said workpiece to melt the surfaces of said one end of said stud and a portion of said workpiece and to weld the stud to the workpiece when they are stuck together.

9. A method of stud welding comprising the steps of:

supporting a welding stud in a stud holder a predetermined height above a workpiece, said stud having a tip portion of smaller cross sectional area than the shank of said stud and of a predetermined length projecting centrally from one end of the stud toward said workpiece;

releasing said stud holder to cause said holder to fall freely downward entirely by the force of gravity so that said one end of said stud strikes said workpiece with a predetermined force at a velocity which is substantially constant for successive welds;

absorbing the shock of impact between said stud and said workpiece to prevent rebound of said stud away from said workpiece; and applying an electrical potential between said stud and said workpiece to completely vaporize said tip portion and produce an electrical arc between said stud and said workpiece to melt the surfaces of said one end of said stud and a portion of said workpiece and to weld the stud to the workpiece when they are struck together.

10. A method of stud welding comprising the steps of:

supporting a welding stud against a stop in a stud holder a predetermined height above a workpiece, said stud having a tip portion of smaller cross sectional area than the shank of said stud and of a predetermined length projecting centrally from one end of the stud toward said workpiece;

releasing said stud holder to cause said holder to fall downward entirely by the force of gravity so that said one end of said stud strikes said workpiece with a predetermined force at a velocity which is substantially constant for successive welds;

absorbing the force of impact between said stud and said workpiece to reduce rebound of said stud away from said workpiece during formation of the weld;

guiding the downward movement of said stud holder to prevent rotation of said stud;

applying an electrical potential between said stud and said workpiece to completely vaporize said tip portion and produce an electrical arc between said stud and said workpiece to melt the surfaces of said one end of said stud and a portion of said workpiece and to weld the stud to the workpiece when they are struck together; and raising the stud holder upward from said workpiece to remove the welded stud from said holder.

References Cited

UNITED STATES PATENTS

| 1,066,468 | 7/1913 | Chubb | 219—95 |
| 1,788,908 | 1/1931 | Buttolph | 219—95 |
| 2,610,278 | 9/1952 | Graham | 219—98 |
| 2,661,599 | 12/1953 | Folmer | 219—89 |
| 3,047,711 | 7/1962 | Graham | 219—99 |
| 3,234,354 | 2/1966 | Penberg | 219—119 |
| 1,403,292 | 1/1922 | Chubb | 219—95 |
| 3,098,150 | 7/1963 | Inoue | 219—76 X |

RICHARD M. WOOD, *Primary Examiner.*

C. CHADD, *Assistant Examiner.*

U.S. Cl. X.R.

219—96, 98, 99